United States Patent
Hansson

(10) Patent No.: US 9,777,900 B2
(45) Date of Patent: Oct. 3, 2017

(54) LIGHT-EMITTING DIODE INPUT FOR HYBRID SOLAR LIGHTING SYSTEMS

(71) Applicant: OFS FITEL, LLC, Norcross, GA (US)

(72) Inventor: Jan I Hansson, West Hartford, CT (US)

(73) Assignee: OFS FITEL, LLC, Norcross, GA (US)

( * ) Notice: Subject to any disclaimer, the term of this patent is extended or adjusted under 35 U.S.C. 154(b) by 100 days.

(21) Appl. No.: 14/774,480

(22) PCT Filed: Mar. 13, 2013

(86) PCT No.: PCT/US2013/030726
§ 371 (c)(1),
(2) Date: Sep. 10, 2015

(87) PCT Pub. No.: WO2014/142816
PCT Pub. Date: Sep. 18, 2014

(65) Prior Publication Data
US 2016/0033100 A1    Feb. 4, 2016

(51) Int. Cl.
| | |
|---|---|
| *F21S 19/00* | (2006.01) |
| *F21V 5/04* | (2006.01) |
| *F21V 8/00* | (2006.01) |
| *G02B 19/00* | (2006.01) |
| *F21V 7/06* | (2006.01) |
| *F21V 23/04* | (2006.01) |
| *F21V 13/12* | (2006.01) |
| *G02B 6/42* | (2006.01) |
| *F24J 2/06* | (2006.01) |
| *F24J 2/08* | (2006.01) |
| *F21Y 105/10* | (2016.01) |
| *F21Y 115/10* | (2016.01) |

(52) U.S. Cl.
CPC ............ *F21S 19/005* (2013.01); *F21V 5/045* (2013.01); *F21V 7/06* (2013.01); *F21V 23/0464* (2013.01); *G02B 6/0006* (2013.01); *G02B 19/0028* (2013.01); *G02B 19/0066* (2013.01); *F21V 13/12* (2013.01); *F21Y 2105/10* (2016.08); *F21Y 2115/10* (2016.08); *F24J 2/06* (2013.01); *F24J 2/067* (2013.01); *F24J 2/085* (2013.01); *G02B 6/4298* (2013.01)

(58) Field of Classification Search
CPC ...... F21S 11/007; F21S 11/002; F21S 19/005; F21V 5/045
USPC .................................................. 359/591–598
See application file for complete search history.

(56) References Cited

U.S. PATENT DOCUMENTS

| | | | | |
|---|---|---|---|---|
| 8,184,372 B1* | 5/2012 | Gu | ........................... | G02B 3/08 359/597 |
| 2003/0147254 A1* | 8/2003 | Yoneda | .................. | G01B 11/00 362/551 |
| 2006/0023458 A1* | 2/2006 | Becker | ..................... | F21V 5/04 362/335 |
| 2006/0091415 A1* | 5/2006 | Yan | ......................... | H01L 33/60 257/99 |

(Continued)

*Primary Examiner* — Julie Bannan
(74) *Attorney, Agent, or Firm* — Sam S. Han, Esq.

(57) ABSTRACT

A hybrid lighting system is disclosed in which light emitting diodes (LEDs) provide input light when illumination with solar light is unavailable. Light from LEDs are propagated through an optical fiber, which delivers the light to a point of illumination. The disclosed system reduces the amount of electricity and electric conduit for light in areas using hybrid lighting systems.

10 Claims, 4 Drawing Sheets

(56) References Cited

U.S. PATENT DOCUMENTS

| | | | |
|---|---|---|---|
| 2006/0104081 A1* | 5/2006 | Fraval | F21S 11/00 362/557 |
| 2007/0091618 A1* | 4/2007 | Belek | B29C 65/54 362/345 |
| 2008/0037273 A1* | 2/2008 | Muehlemann | G02B 6/0008 362/581 |
| 2012/0044682 A1* | 2/2012 | Allen | F21V 5/045 362/241 |
| 2012/0243252 A1* | 9/2012 | Kim | F21S 11/00 362/554 |
| 2013/0088142 A1* | 4/2013 | Allen | F21K 9/62 313/498 |
| 2013/0114286 A1* | 5/2013 | Ertl | G02B 6/3504 362/555 |
| 2013/0155643 A1* | 6/2013 | Meyer | G02B 6/0008 362/2 |
| 2015/0083221 A1* | 3/2015 | Boonekamp | A01G 7/045 136/259 |

\* cited by examiner

LIGHT-EMITTING DIODE INPUT FOR HYBRID SOLAR LIGHTING SYSTEMS

BACKGROUND

Technical Field

The present disclosure relates generally to passive solar lighting and, more specifically, to hybrid solar lighting systems using fiber optics.

Description of the Related Art

Optical fibers already play important roles in many applications including long-distance telecommunication and industrial lasers. They can be advantageously used as a transmission medium for passive solar lighting. Hybrid lighting systems are defined as a combination of passive solar and artificial lighting, thus allowing for illumination during times when sunlight is unavailable. In some instances, hybrid lighting systems are more economical and environmentally friendly compared to traditional artificial lighting systems, thus, there are ongoing efforts to improve hybrid lighting techniques.

SUMMARY

A hybrid lighting system is disclosed in which light from light-emitting diodes (LEDs) shares an optical fiber distribution system with sunlight from a solar collector, delivering light to a point of illumination. The disclosed system reduces the amount of electricity and electric conduit for light in areas using hybrid lighting systems.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
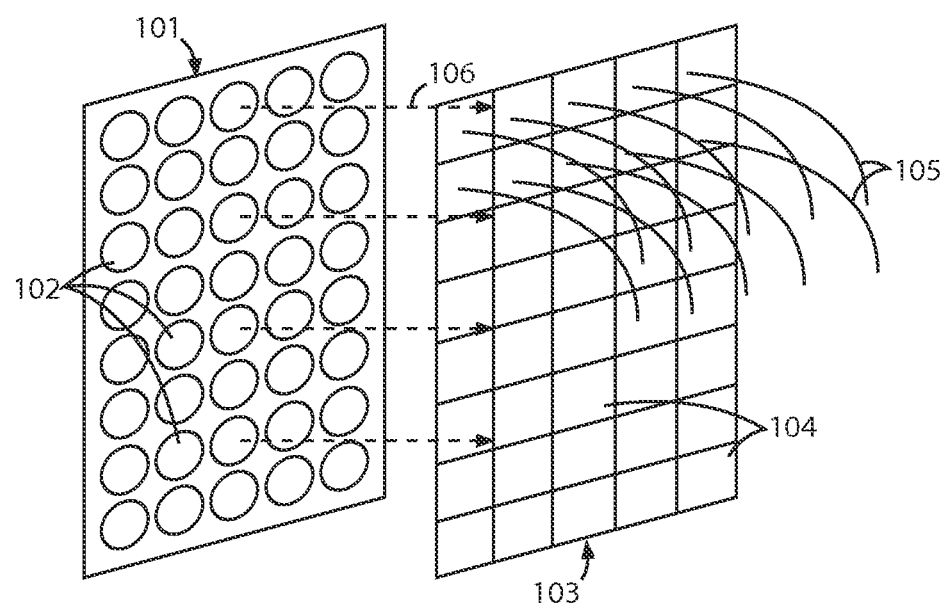
FIG. 1 shows one embodiment of a hybrid lighting system, according to an aspect of the present invention.

Passive lighting refers to renewable lighting that relies on sunlight to illuminate interior areas in buildings and other structures. Passive lighting can be achieved by adding windows or skylights to a building or by collecting the solar light from outside and delivering it to a desired point of illumination inside by a conduit, such as an optical fiber. Passive lighting works well when ample sunlight is available. However, pure passive lighting systems do not function when sunlight is low or absent. Collection and concentration of low or absent sunlight does not provide adequate interior illumination. Thus, hybrid lighting systems exist to address this problem.

Hybrid lighting systems are those that have a passive lighting system that is supplemented with an artificial lighting component. In times of low or absent sunlight, such as during cloud cover or at night, the artificial lighting component is used to provide illumination. Typically, hybrid lighting systems have an artificial light source at the point of illumination. For example, a fixture at the point of illumination in a typical hybrid lighting system may contain the conduit for the passive lighting system as well as an artificial light, which is powered by electricity and can be switched on at the fixture as necessary.

Suffice it to say, traditional hybrid systems work well in structures that have a readily available electrical supply at the point of illumination. On the other hand, traditional systems are poorly suited for buildings where electrical access is only at a few points within the building. Additionally, in new construction, increased economic and environmental savings may be achieved with improved hybrid lighting designs that reduce the amount of electrical energy and materials that are typically used for the artificial component. In view of this, there exists a need for an improved hybrid light system, which is commercially viable and suitable for buildings with limited electrical access and, also, for new building constructions.

Light emitting diodes (LEDs) are a form of solid-state lighting known in the art to use energy more efficiently compared to other artificial lighting solutions. At its core, a LED is a small chip comprising layers of a semi-conducting material that, when turned-on, allow for electron recombination with electron holes in the layers, releasing energy as photons. LEDs present many advantages over other artificial light sources, including but not limited to lower energy consumption, longer lifetime, smaller size, and greater physical robustness. Thus, LEDs are well suited for use in a hybrid lighting system aimed at reducing cost and energy consumption.

With these concepts in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 shows one embodiment of a hybrid lighting system in which a panel of LEDs collects and distributes light to illumination points by optical fibers. In one embodiment, the system comprises a LED panel 101, which comprises individual LEDs 102. The LED panel 101 is configured so that it may be oriented to face a solar collector panel 103. Solar collector panels are well known in the art, therefore only a brief discussion as it relates to the disclosed embodiments is presented here. The solar collector panel 103 is comprised of individual concentration lenses 104 arranged to form a panel. Preferably, the concentrations lenses 104 are Fresnel lenses.

During periods of adequate solar light, such as during the middle of a day when there is no cloud cover, the LED panel 101 is powered off and does not directly face the solar collector panel 103. When solar light is inadequate, such as near sunrise or sunset, or unavailable, such as during night, the LED panel 101 is powered on and faces the solar collector panel 103 directly. In operation, the LEDs 102 in the LED panel 101 provide artificial light 106 to the solar collector panel 103. Light is then propagated through optical fibers 105 coupled to the solar collector panel 103 to a point of illumination. In other words, light from the solar collector panel 103, albeit originally from sunlight or light emitted from LEDs, is distributed to a point of illumination by optical fibers. Preferably, optical fibers are silica-based fibers with low attenuation. In other embodiments, the optical fiber may be made of another suitable material, such as plastic. In short, FIG. 1 is representative of a hybrid light distribution system, wherein sunlight, as a primary light source, and light emitted from LEDs, as a secondary light source, share an optical fiber to distribute light to a point of illumination.

For some embodiments the solar collector panel 103 may be in a fixed position and the LED panel 101 may be adjustable. In these embodiments, when there is adequate solar light, the LED panel 101 is moved so that it does not come between the solar collector panel 103 and the sun. When there is inadequate solar light, the LED panel 101 may be adjusted so that it faces the solar collector panel 103. For example, the LED panel 101 may be coupled to a support member and, thus, may be rotated around an axis on the support member to face towards or away from the solar collector panel 103. Once the LED panel 101 faces the solar collector panel 103, the LED panel 101 is switched on and transmits light 106 to the solar collector panel 103. Light is then propagated through optical fibers 105 to a point of illumination.

In other embodiments, the LED panel 101 may be fixed while the solar collector panel 101 is adjustable. When there is adequate solar light, the solar collector panel 103 is moved so that the LED panel 101 is not between the solar collector panel 103 and the sun. When there is inadequate solar light, the solar collector panel 103 is adjusted so that it faces the LED panel 101. For example, the solar collector panel 103 may be coupled to a support member and, thus, may be rotated around an axis on the support member to face towards or away from the LED panel 101. Once the solar collector panel 103 faces the LED panel 101, the LED panel 101 is switched on and transmits light 106 to the solar collector panel 103. Light is then propagated through optical fibers 105 to a point of illumination.

Additionally, both the LED panel 101 and the solar collector panel 103 may be adjustable. Thus, when there is adequate solar light both the LED panel 101 and the solar collector panel may be moved so that the LED panel 101 is not between the solar collector panel 103 and the sun. When there is inadequate solar light the solar collector panel 103 and LED panel 101 are adjusted so that they face each other.

In short, the solar collector panel 103 collects natural light from the sun, when solar light is adequate, or artificial light from the LED panel 103, when solar light is inadequate. Collected light is then propagated through optical fibers 105 to endpoints of illumination. Controlling light output from the LEDs 102 can control intensity of endpoint illumination. Embodiments employing this configuration are advantageous for applications in which simplicity of design is important.

Figure 2:
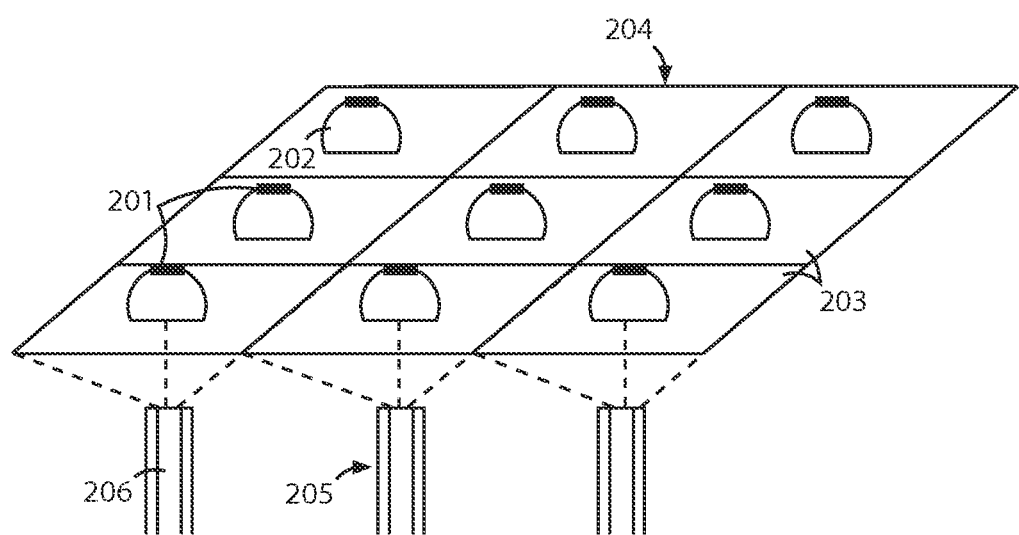
FIG. 2 shows another embodiment of a hybrid lighting system, according to an aspect of the present invention.

Although the embodiments disclosed in relation to FIG. 1 have the advantage of a simple and robust design, they do not provide a mechanism to control which end points receive illumination without wasting light produced by the LEDs 102. With this in mind, attention is turned to FIG. 2, which shows another embodiment of a hybrid lighting system. In the embodiment of FIG. 2, LEDs 201 are coupled to reflectors 202 of a solar collector panel 204. Preferably, each reflector 202 is parabolic, and the corresponding LED 201 is mounted at the focal point of the reflector 202.

Each reflector-LED combination is in turn coupled to a concentration lens 203. Preferably, the concentration lenses 203 are Fresnel lenses. Stated differently, the solar collector panel 204 comprises one or more individual concentration lenses 203. Each concentration lens 203 has a corresponding reflector 202 and an LED 201 mounted on it. Thus, unlike the embodiments disclosed in relation to FIG. 1, the embodiments disclosed in relation to FIG. 2 do not have a separate LED panel 101. Instead, the each concentration lens 203 of the solar collector panel 204 has a corresponding LED 201 and reflector 202. Thus, the artificial light source is not housed in a separate device, but rather is an integrated component of the solar collector panel 204.

Figure 3A:
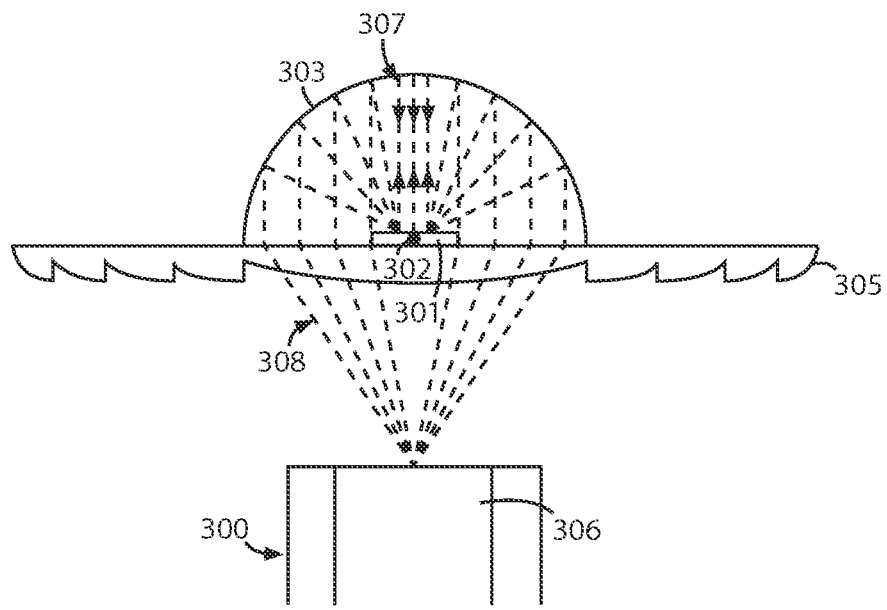
FIGS. 3A and 3B show several embodiments of light-emitting diodes (LEDs) and reflectors integrated with concentration lenses, where the LEDs are used as a light source, in accordance with the present invention.
Figure 3B:
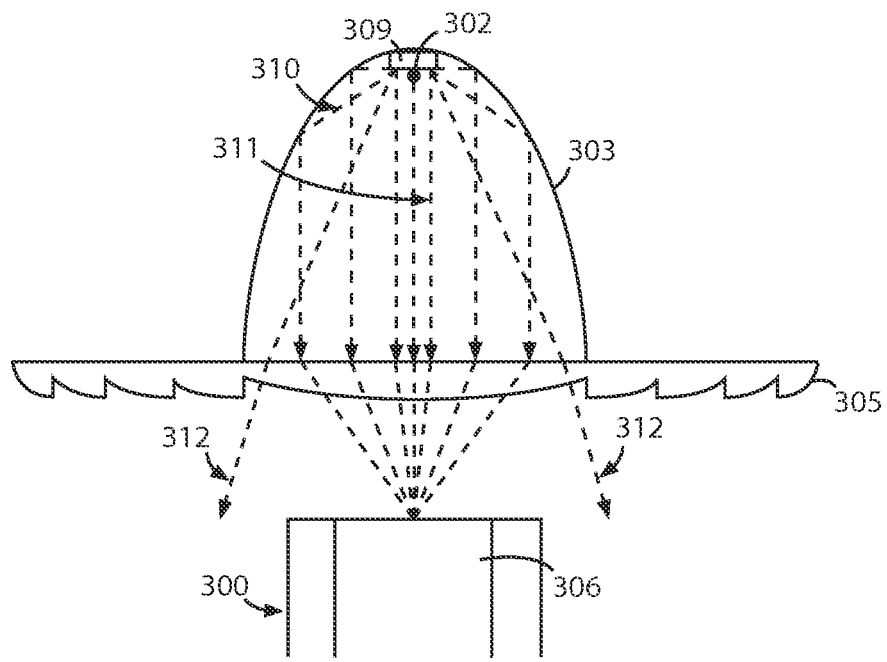

With FIG. 2 in mind, attention is turned to FIGS. 3A and 3B, which show embodiments of LEDs and reflectors integrated with concentration lenses of the solar collector panel 204 of FIG. 2. The embodiments disclosed with reference to FIGS. 3A through 3D are further examples of hybrid light distribution systems, wherein sunlight, as a primary light source, and light emitted from LEDs, as a secondary light source, share an optical fiber to distribute light to a point of illumination.

As shown in FIG. 3A, in one embodiment, an LED 301 is positioned at a focal point 302 of a parabolic reflector 303 such that the LED 301 faces the vertex of the parabolic reflector 303. The parabolic reflector 303 is coupled to a concentration lens 305. In a preferred embodiment, the concentration lens 305 is a Fresnel lens.

In some embodiments, the LED 301 is inward facing, thus projecting light primarily towards a vertex of the parabolic reflector 303. For some of the inward-facing LED embodiments, the LED 301 is held at the focal point 302 by a bridge that spans the parabolic reflector 303 (not shown in FIG. 3A). In other inward-facing LED embodiments, the parabolic reflector 303 is so dimensioned to achieve a focal point 302 on the concentration lens 305. In these embodiments, the LED 301 is mounted on the concentration lens 305 at the focal point 302, as shown in FIG. 3A. As one having ordinary skill in the art will appreciate, the placement of the LED 301 on the concentration lens 305 as described, has advantages as the concentration lens 305 provides an available surface that can also carry electrical connections. Furthermore, having a focal point on the concentration lens 305 removes the need for a separate mounting mechanism for the LED 301.

In operation, when there is adequate solar light, the LED 301 is switched off and solar light passes through an unobstructed portion of the concentration lens 305 and is propagated into a core 306 of an optical fiber 300. When there is inadequate solar light, the LED 301 is switched on and emitted light 308 from the LED 301 is directed towards the parabolic reflector 303, which reflects collimated light through the concentration lens 305 and into a core 306 of a nearby optical fiber 300, which may be directly connected to, or alternatively, may be placed near or adjacent to the concentration lens 305. One disadvantage of this embodiment is that some of the light emitted from the inward-facing LED 301 will be reflected back directly 307 at the LED 301 itself and thus not be coupled into the core 306 of the optical fiber 300. Stated differently, the inward-facing LED 301 has one small region that acts effectively as its own obstruction and reduces the amount of light reaching the core 306 of the optical fiber 300.

With this limitation of FIG. 3A in mind, attention is turned to FIG. 3B, which shows another embodiment with a forward-facing LED 309 and a parabolic reflector 303 integrated with a concentration lens 305 of the solar collector panel 204 of FIG. 2. As shown in FIG. 3B, in one embodiment, a forward-facing LED 309 is positioned at a focal point 302 of a parabolic reflector 303 such that the LED 309 faces the concentration lens 305, away from the vertex of the parabolic reflector 303. In one preferred embodiment, the concentration lens 305 is a Fresnel lens. For some embodiments, the LED 309 is coupled to the rear of the parabolic reflector 303 by a support structure, or, alternatively, by directly mounting the LED 309 to the parabolic reflector 303 (depending on the dimensions of the LED 309).

In other embodiments, the parabolic reflector 303 is truncated at the vertex, thus making a hole in the parabolic reflector 303. For these embodiments, the LED 309 is coupled to the parabolic reflector 303 by being placed in the hole created by truncating the parabolic reflector 303 at its vertex. In either embodiment, it should be appreciated that the light source is located at the focal point 302, such that the light 310, 311 reflecting from the parabolic reflector is collimated when it reaches the concentration lens 305.

In operation, when there is adequate solar light, the LED 309 is switched off and solar light passes through the concentration lens 305 and is propagated into the core 306 of the optical fiber 300, which is placed near, or connected directly to, concentration lens 305. When there is inadequate solar light, the LED 309 is switched on and emitted light 310, 311 from the LED 309 is directed towards the parabolic reflector 303 as well as towards the concentration lens 305. Specifically, light 310 reflected by the parabolic reflector 303 is collimated and passed through the concentration lens 305 and coupled into the core 306 of the optical fiber 300; light 311 emitted directly towards the concentration lens 305 is passed through the concentration lens 305 and coupled into the core 306 of the optical fiber 300.

While this embodiment does not result in the LED 309 blocking reflected light as does the embodiments described in relation to FIG. 3A, the forward-facing LED 309 may generate some light 312 that is emitted at an angle such that this light 312 will not be coupled into the core 306 of the optical fiber 300. In other words, some light 312 will be generated from the forward-facing LED 309 that is emitted at an angle that does not get focused into the optical fiber core 306. Furthermore, some of the un-collimated light may enter the core 306 at an angle that is beyond the critical angle of the core 306 and not be propagated in the optical fiber 300. These may be compensated for in some embodiments by increasing the depth of the parabolic reflector 303. Parabolic reflectors exist with a wide range of curves, from very shallow to very deep. One having an ordinary skill will appreciate that increasing the depth of the parabolic reflector 303 and placing the LED 309 at a deeper focal point 302 will limit the amount of un-reflected rays 312. Stated differently, deep placement of the LED 309 in a deep parabolic reflector 303 limits the opening angle for direct, un-reflected light rays 312, thus mitigating the aforementioned shortcoming of FIG. 3B. In other embodiments, the aforementioned shortcoming may be mitigated by adding additional LEDs that are mounted back-to-back at the focal point of the parabolic reflector 303. In these embodiments, the LEDs mounted back-to-back are positioned to emit light sideways onto the parabolic reflector 303, such that substantially all light is reflected before entering the concentration lens 305.

Figure 3C:
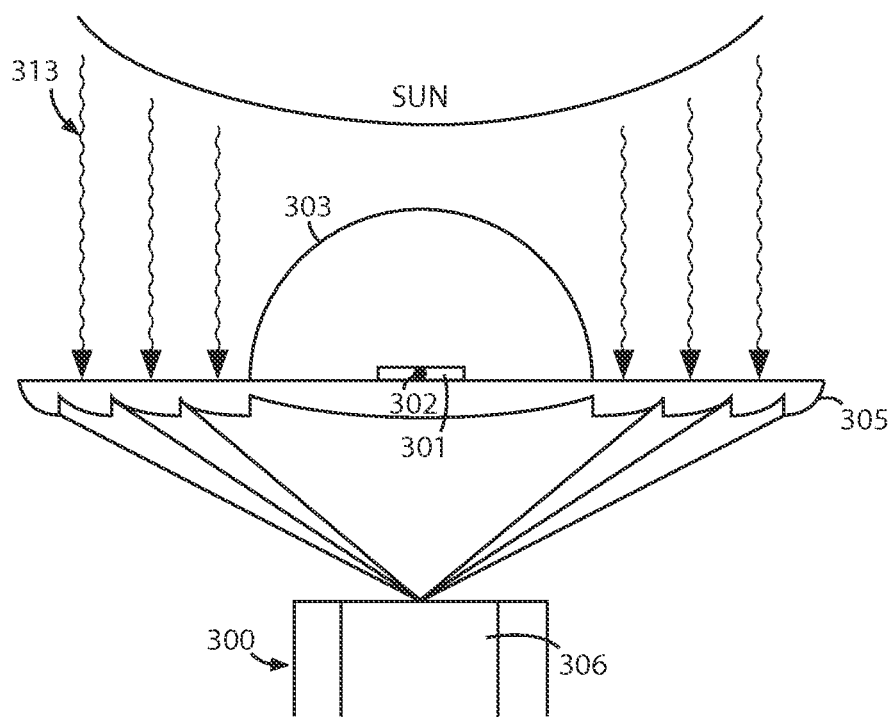
FIGS. 3C and 3D show several embodiments of LEDs and reflectors integrated with concentration lenses, wherein sunlight is used as the light source, in accordance with the present invention.
Figure 3D:
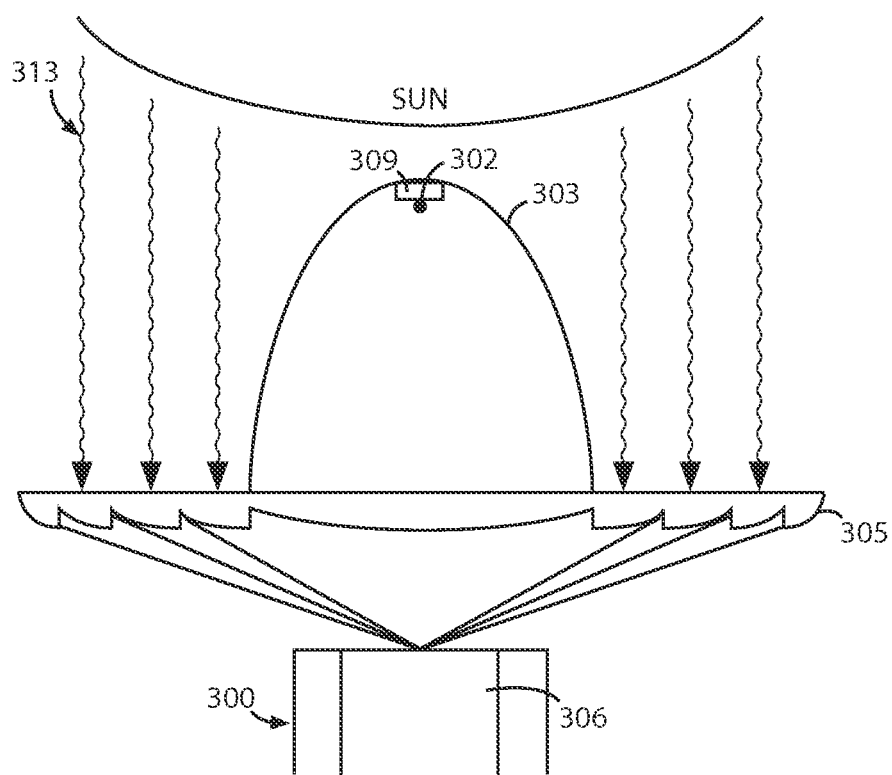

For clarity, FIGS. 3C and 3D show the embodiments (corresponding to FIGS. 3A and 3B) when they are used with sunlight 313, rather than LEDs. Thus, while the LED 301 and the parabolic reflector 303 are still present and pose a slight obstruction to the sunlight 313, those components are relatively small compared to the light-gathering surface of concentration lens 305. Thus, the sunlight 313 passes through the unobstructed portion of the concentration lens 305 and is propagated into the core 306 of the optical fiber 300. It should also be appreciated that, depending on the amount of available sunlight, the LEDs can be used in conjunction with the sunlight, rather than in lieu of the sunlight.

Referring back to FIG. 2, when there is inadequate solar light, the LEDs 201 are switched on and light emitted from the LEDs 201 are directed by the reflectors 202, through the concentration lenses 203, and propagated through optical fibers 205. Preferably, the optical fibers 205 comprise silica. Alternatively, the optical fibers 205 may comprise some other suitable material such as plastic. Both the LEDs 201 and reflectors 202 are small enough as to permit transmission of enough solar light through the solar collector panel 204 to provide an adequate point of use lighting when there is adequate solar light available.

At this point, it is worthwhile to note that the system also comprises a light detector (not shown) for measuring the available solar light, in order to determine whether or not adequate solar light is available. Since light-detection mechanisms are well-known in the art, further discussion of light-detection mechanisms is omitted herein. Additionally, it should be noted that the LED panel can be activated as a function of the amount of measured sunlight. In other words, depending on the availability of sunlight, only a subset of the LEDs can be activated, thereby further increasing the efficiency of the system. Since such triggering mechanisms are also known in the art, further discussion of those triggering mechanisms is omitted herein.

Additionally, the LEDs 201 are powerful enough to generate the same amount of visible light as the amount of solar light collected by the collector panel. In one embodiment, the collector panel 204 measures 20 centimeters (cm) by 80 cm and comprises 36 individual concentration lenses 203. In the center of each concentration lens 203 is a small, 5 Watt commercially available LED 201 and reflector 202. This configuration results in collection and propagation of an equivalent amount of visible light emitted from the LEDs 201 and solar light, while not significantly inhibiting collection of solar light when LEDs 201 are not utilized.

Embodiments that comprise an integrated LED 201 and concentration lens 203 have the advantage of being able to switch on individual LEDs, thus allowing only passage of light through certain optical fibers 205. Thus, these embodiments are particularly well-suited for hybrid lighting systems where the ability to balance the output of light is important. For example, this particular embodiment is well suited for a new building construction where the hybrid lighting system provides interior lighting to different rooms from the same solar collector panel. This configuration allows for individual LEDs to be turned on and off, thus providing light via optical fibers to individual areas within the new building construction, while eliminating the need for electric components to be supplied to the point of illumination.

Using the embodiments disclosed herein, significant cost and energy savings can be attained. In all embodiments, the artificial light source is present at the point of light collection. This is in stark contrast to traditional hybrid lighting systems in which the artificial light source is present at the endpoint of light transmission. Therefore, in the disclosed embodiments, electricity need only be provided at the point of light collection rather than at all of the individual points of illumination, as currently implemented in traditional hybrid lighting systems. Thus, an electric conduit need only be supplied to a few central points for the disclosed embodiments, as opposed to being supplied to each point of illumination for traditional hybrid lighting systems. This results in significant cost savings.

Although exemplary embodiments have been shown and described, it will be apparent to those of ordinary skill in the art that a number of changes, modifications, or alterations to the disclosure as described may be made. Additionally, one having ordinary skill in the art will understand that an adequate amount of sunlight is context-dependent. Thus, depending on the application, the amount of sunlight that is required to trigger the activation of the LEDs may differ. Also, those having skill in the art will understand that sunlight and solar light are used interchangeably herein. Since those skilled in the art will appreciate how to readily decide how much sunlight is adequate based on the lighting situations, specific examples of light intensities are omitted herein.

What is claimed is:

1. A solar collector panel, comprising:
   a light detector to detect adequacy of sunlight;
   light emitting diodes (LEDs), each LED being an integrated component of the solar collector panel, each LED to provide artificial light in the absence of adequate sunlight;
   a triggering mechanism operatively coupled to the light detector, the triggering mechanism further being operatively coupled to each LED, the triggering mechanism to activate each LED in response to the light detector detecting the absence of adequate sunlight;
   parabolic reflectors, each parabolic reflector having a focal point, each parabolic reflector being an integrated component of the solar collector panel, each parabolic reflector being optically coupled to at least one of the LEDs such that the LED is located at the focal point of the parabolic reflector, each parabolic reflector having an internal reflective surface to reflect the artificial light;
   concentration lenses, each concentration lens being optically coupled to at least one of the parabolic reflectors such that the internal reflective surface faces toward the concentration lens, each concentration lens having a corresponding LED mounted on the concentration lens, each concentration lens to focus the reflected light in the absence of adequate sunlight, each concentration lens further to focus light from the sun in the presence of adequate sunlight; and
   optical fibers, each optical fiber being optically coupled to at least one of the concentration lenses, each optical fiber to propagate the focused light from its corresponding concentration lens.

2. The solar collector panel of claim 1, the concentration lenses being Fresnel lenses.

3. The solar collector panel of claim 1, further comprising 36 LEDs.

4. The solar collector panel of claim 1, each of the LEDs being approximately 5 Watts.

5. The solar collector panel of claim 1, the optical fibers being silica-based optical fibers.

6. A hybrid lighting system, comprising:
   a solar collector panel;
   a light detector to detect adequacy of sunlight;
   light emitting diodes (LEDs) to provide artificial light in the absence of adequate sunlight, each LED being an integrated component of the solar collector panel;
   a triggering mechanism operatively coupled to the light detector, the triggering mechanism further being operatively coupled to the LEDs, the triggering mechanism to activate the LEDs in response to the light detector detecting the absence of adequate sunlight;
   reflectors having internal reflective surfaces, each reflector being an integrated component of the solar collector panel, each reflector being optically coupled to at least one of the LEDs, each reflector to reflect the artificial light;
   lenses, each lens being optically coupled to at least one of the reflectors such that the internal reflective surface faces the lens, each lens to focus light from the sun in the presence of adequate sunlight, each lens further to focus the reflected artificial light in the absence of adequate sunlight; and
   optical fibers, each optical fiber being optically coupled to at least one of the lenses, each optical fiber to propagate the focused light.

7. The system of claim 6, each of the reflectors being a parabolic reflector.

8. The system of claim 6, each LED being located at a focal point of its corresponding parabolic reflector.

9. The system of claim 6, each of the lenses being a Fresnel lens.

10. The system of claim 6, each of the optical fibers being a silica-based optical fiber.

* * * * *